Patented Oct. 18, 1932

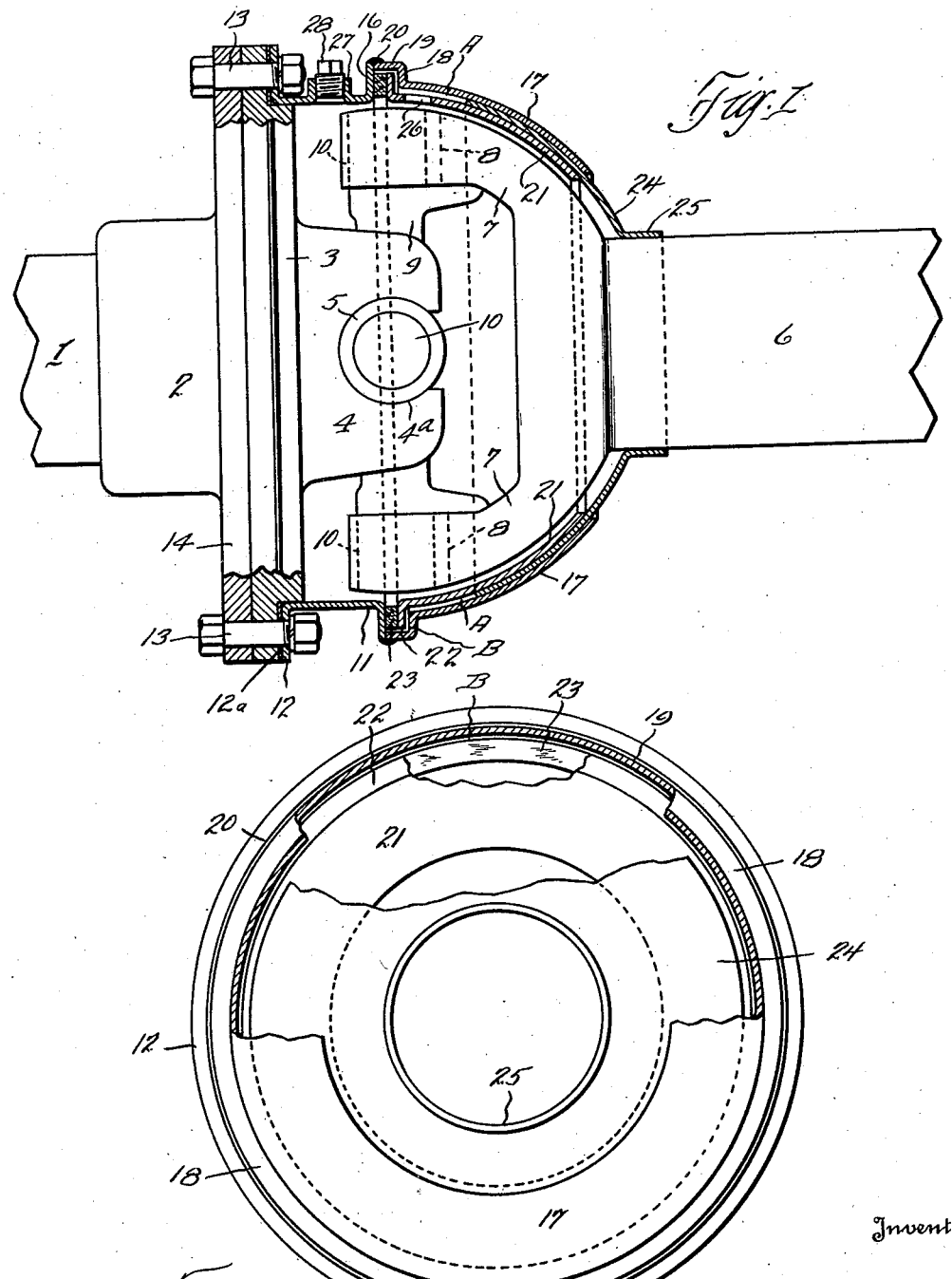

1,883,688

UNITED STATES PATENT OFFICE

CATLIN GEROLD, OF LOS ANGELES, CALIFORNIA

HOUSING FOR UNIVERSAL JOINTS

Application filed June 4, 1930. Serial No. 459,139.

This invention relates to universal joints, and more particularly to the housings which are employed for the purpose of retaining lubricant and supplying the same in operative relation to the working parts of such joints.

It is the general purpose and object of the invention to provide, for a joint of the character referred to, a housing comprising a plurality of interleaving housing sections, each in the shape of the segment of a sphere and so constructed and arranged as to permit relative oscillatory movement of the housing sections due to misalignment of the shaft sections connected by such joint, while preventing the escape of lubricant from between such sections. A further object of the invention is to enable this result to be accomplished without the use of special packings and springs such as it has been customary to employ heretofore in connection with housings of the general type referred to.

Further and more limited objects of the invention will appear hereinafter, and will be realized in and through the construction and arrangement of parts shown in the drawing hereof, wherein Fig. 1 represents a longitudinal sectional elevation of a universal joint equipped with a housing constructed in accordance with my invention and showing the ends of the shaft sections connected by said joint; and Fig. 2 an elevation of the housing with certain parts broken away.

Describing by reference characters the various parts illustrated herein, 1 denotes one of two shaft sections provided with a hub 2 having a flange 3 provided with yoke arms 4 each having a slotted bearing bore 4ª for the reception of a bushing 5.

6 denotes the hub end of another shaft section provided with yokes 7 each having a slotted bearing bore corresponding to the bores 4ª, for the reception of a bushing 8. The yokes 4 and 7 are connected by cross pins 9, each having trunnions 10, fitted within the bushings 5 and 8. The construction thus far described is merely illustrative of one type of universal joint which may be employed for connecting two opposed shaft sections.

For the purpose of supplying lubricant to the working parts of the joint as well as for retaining the lubricant, I provide a sectional housing, the same comprising a cylindrical housing member 11 of less diameter than the diameter of the flange 3 and itself having a radial flange 12 at one end adapted to be secured to the flange 3 by bolts 13, the said bolts extending through the flange 12, the flange 3, and the companion flange 14. The heads of the bolts are adapted to engage the companion flange 14, and a packing gasket 12ª is interposed between the flanges 3 and 12.

At its end opposite the flange 12, the housing section 11 is provided with a radially outwardly extending flange 16 of less diameter than the flange 12. An outer spherical housing section 17 is secured to the flange 16 in the following manner:— at its enlarged end, the section 17 is provided with an annular projection formed by an L-shaped flange consisting of a radial flange member 18 and a cylindrical flange member 19, the diameter of the flange member 19 being such that its edge bears against the peripheral portion of the flange 16, preferably with the outer surface of the flange member 19 flush with the outer edge of the flange 16. The flanges 16 and 19 are united in any convenient manner, as by welding the same together, as indicated at 20. 21 denotes an inner spherical housing section having at its enlarged end a radial flange 22, the external diameter of the flange 22 being slightly less than the internal diameter of the cylindrical flange member 19. Between the flange 22 and the flange 16 there is interposed a packing ring or gasket 23 of compressible material, such as cork.

24 denotes an intermediate spherical housing section having its upper enlarged portion of less diameter than the diameters of the enlarged ends of the sections 17 and 21 and inserted between and forming a comparatively snug fit with the inner and outer surfaces of the sections 17 and 21, respectively. The section 24 is provided with a cylindrical neck 25 which fits snugly around and is fitted tightly around the hub of the shaft section 6. The enlarged portion of the housing section 24 projects into the space between the sections 17 and 21, with its enlarged end spaced a considerable distance from the flange 22, whereby an annular chamber A is provided between the sections 17 and 21 beyond the enlarged end of the section 24, the said chamber being adapted to receive lubricant by centrifugal action from the interior of the housing through one or more openings 26. The spherical portion of each housing section 17, 21 and 24 is concentric with the intersection of the axes of the cross pins 9, thereby to accommodate oscillatory movements between the section 24 on the one hand and the sections 17 and 21 on the other hand, due to lack of alignment of the shaft sections which are connected by the universal joint.

It will be noted that the packing ring 23, being under compression, will tend to force the flange 22 toward the flange member 18 and will thereby maintain contact between the outer surface of the housing section 21 and the inner surface of the housing section 24, as well as maintaining contact between the outer surface of the housing section 24 and the inner surface of the housing section 17. Furthermore, owing to the clearance between the flange 22 and the flange 18, 19, an additional annular chamber B of small capacity will be provided for the reception of lubricant and into which the lubricant will tend to flow by centrifugal action, the chamber B constituting a radially outward extension of the chamber A.

The housing is provided, preferably in the cylindrical portion 11 thereof, with a filling connection 27 for the introduction of lubricant from time to time, the said connection being provided with a plug 28. It will be noted further that, because of the centrifugal action which is set up when the joint is rotated, there will be a tendency for the lubricant in the housing to seek the region of greatest diameter, which is the chamber B and the portion of the chamber A which is of greatest diameter. This prevents any leakage between the overlapping portions of the housing sections 17, 21 and 24, the chambers A and B meanwhile providing means for lubricating, by capillary action, the adjacent contacting surfaces of the said sections. Furthermore, by the provision of the compressible packing ring 23, provision is made for automatically compensating for any wear which may occur between the said housing sections, the ring operating to press the section 21 toward and against the section 24, which will, of course, press the latter section toward the section 17, it being noted that the neck 25 may slide upon the hub of the shaft section 6.

It will be noted that the external diameter of the housing proper is of less diameter than the external diameter of the flanges 12, 3 and 14. This enables a joint equipped with my housing to be used wherever the ordinary universal joint is used, without interference with the various parts of the chassis assembly, due to the fact that no part of the housing is of greater diameter than the diameter of the flanges 3 and 14.

Having thus described my invention, what I claim is:

1. The combination, with a pair of shaft sections and means for connecting the same, the said means comprising a universal joint, of a lubricant-containing housing for the said joint, the said housing comprising a member connected at one end to one of said sections, an inner and an outer spherical housing section, the outer section having its enlarged end connected to the other end of the said housing member, the said spherical sections being concentric and there being a space provided therebetween, an intermediate spherical housing section also concentric with the first mentioned spherical sections and having its enlarged end inserted between the first mentioned spherical sections, the enlarged end of the last mentioned section being of less diameter than the enlarged ends of the other two spherical sections, the third spherical section having a reduced portion connected to the other shaft section, means for supplying lubricant by centrifugal action from the interior of the housing to the chamber provided between the enlarged portions of the inner and outer spherical sections and beyond the enlarged end of the intermediate section, and means yieldingly forcing the inner spherical section toward the outer spherical section thereby to maintain a capillary seal between the said sections.

2. The combination, with a pair of shaft sections and means for connecting the same, the said means comprising a universal joint, of a lubricant containing housing for said joint, the said housing comprising a member connected at one end to one of said shaft sections, an inner and an outer spherical housing section, one of said housing sections having its enlarged end connected to the other end of the said housing member, the said spherical sections being concentric and there being a space provided therebetween, an intermediate spherical housing section also concentric with the first mentioned spherical sections and having its enlarged end inserted between the first mentioned spherical sections, the enlarged end of the last mentioned section being of less diameter than the enlarged ends of the other two spherical sections, the third spherical section having a reduced portion connected to the other shaft section, means for supplying lubricant by centrifugal action from the interior of the housing to the chamber provided between the enlarged portions of the inner and outer spherical sections and beyond the enlarged end of the intermediate section, and means yieldingly forcing the spherical section which is disconnected from the housing member toward the other spherical sections, thereby to maintain a capillary seal between the said sections.

3. The combination, with a pair of shaft sections and means for connecting the same, the said means comprising a universal joint, a lubricant-containing housing for the said joint, the said housing comprising a member connected at one end to one of said shaft sections and provided with an outwardly extending radial flange at its opposite end, an inner spherical housing section having a radially outwardly extending flange at its enlarged end of less diameter than the diameter of the first mentioned flange, an outer spherical section concentric with the inner spherical section and having its enlarged end provided with a flange surrounding the flange on the inner spherical section and secured to the first mentioned flange and spaced from the flange of the inner spherical housing section, an intermediate spherical housing section having its reduced end connected to the other shaft section with its spherical portion interposed between the first two spherical sections, the spherical portion of the third section being concentric with the inner and outer spherical sections and the enlarged end of the third section being of smaller diameter than the diameter of the enlarged ends of the inner and outer sections whereby a chamber will be provided between such inner and outer sections beyond the enlarged end of the intermediate section, means interposed between the flanges of the housing member and the flange of the inner spherical section for pressing such inner spherical section toward the outer spherical section, and means for supplying lubricant by centrifugal action from the interior of the housing to said chamber.

4. The combination, with a pair of shaft sections and means for connecting the same, the said means comprising a universal joint, a lubricant containing housing for the said joint, the said housing comprising a member connected at one end to one of said shaft sections and provided with an outwardly extending radial flange at its opposite end, an inner spherical housing section having a radially outwardly extending flange at its enlarged end of less diameter than the diameter of the first mentioned flange, a ring of compressible material interposed between said flanges, an outer spherical section concentric with the inner spherical section and having an L-shaped flange at its enlarged end secured to the first mentioned flange and enclosing and spaced from the flange of the inner spherical housing section, an intermediate spherical housing section having its reduced end connected to the other shaft section with its spherical portion interposed between the first two spherical sections, the spherical portion of the third section being concentric with the inner and outer spherical sections and the enlarged end of the third section being of smaller diameter than the diameters of the enlarged ends of the inner and outer sections whereby a chamber will be provided between such inner and outer sections beyond the enlarged end of the intermediate section, and means for supplying lubricant by centrifugal action from the interior of the housing to said chamber.

5. The combination with a pair of shaft sections and means for connecting the same comprising a flange carried by one of said shaft sections, a yoke carried by said flange, a yoke carried by the opposite shaft section, and a cross member connecting the said yokes, of a housing enclosing the cross member and connections, the said housing comprising a cylindrical member having at one end a radially outwardly extending flange secured to the first mentioned flange and at its opposite end a radially outwardly extending flange of less diameter than the flange at its opposite end, an outer spherical housing section connected at its enlarged end to the second flange of the said housing member, an inner spherical housing section concentric with and spaced from the first spherical section and having a flange at its enlarged end, means interposed between the last-mentioned flange and the second flange on the housing member for yieldingly pressing the second spherical section toward the first spherical section, a third spherical section having its reduced end connected to the second shaft section and having its enlarged portion inserted between the reduced portions of the inner and outer spherical sections, the enlarged end of the intermediate section being of smaller diameter than the enlarged ends of the first and second spherical sections whereby a chamber will be provided between the enlarged portions of the first and second spherical sections beyond the enlarged end of the intermediate section, the inner spherical section having an opening communicating with said chamber.

6. The combination, with a pair of shaft sections and means for uniting the same comprising a flange carried by one of said shaft sections, a yoke carried by said flange, a yoke carried by the opposite shaft section and a cross member connecting the said yokes, of a housing enclosing the cross member and connections, the said housing comprising a cylindrical member having at one end a radially outwardly extending flange secured to the first mentioned flange and at its opposite end a radially outwardly extending flange of less diameter than the flange at its other end, an outer spherical housing section connected at its enlarged end to the second flange of the first housing section, an inner spherical housing section concentric with and spaced from the first spherical section and having a flange at its enlarged end, means interposed between the said flange and the second flange on the said housing member for yieldingly pressing the inner spherical section toward the outer spherical section, a third spherical section having its reduced end connected to the second shaft section and having its enlarged portion inserted between the reduced portions of the inner and outer spherical sections, the enlarged end of the intermediate section being of smaller diameter than the enlarged ends of the first and second spherical sections whereby a chamber will be provided between the enlarged portions of the first and second spherical sections beyond the enlarged end of the intermediate section, there being an outwardly extending chamber communicating at its inner end with the first mentioned chamber and surrounding the flange on the enlarged end of the inner spherical housing section, and means for supplying lubricant by centrifugal action from the interior of said housing to the said chambers.

7. The combination, with a pair of shaft sections and means for connecting the same, the said means comprising a universal joint, a lubricant containing housing for the said joint, the said housing comprising a member connected at one end to one of said shaft sections and provided with an outwardly extending radial flange at its opposite end, an inner spherical housing section having a radially outwardly extending flange at its enlarged end, a ring of compressible material interposed between said flanges, an outer spherical section concentric with the inner spherical section and secured at its enlarged end to the first flange beyond the second flange and an intermediate spherical housing section having its reduced end connected to the other shaft section with its spherical portion interposed between the first two spherical sections, the spherical portion of the third section being concentric with the inner and outer spherical sections and the enlarged end of the third section being of smaller diameter than the diameters of the enlarged ends of the inner and outer sections.

8. The combination, with a pair of shaft sections and means for connecting the same, the said means comprising a universal joint, a lubricant containing housing for the said joint, the said housing comprising a member connected at one end to one of said shaft sections and provided with an outwardly extending radial flange at its opposite end, an inner spherical housing section having a radially outwardly extending flange at its enlarged end of less diameter than the diameter of the first mentioned flange, a ring of compressible material interposed between said flanges, an outer spherical section concentric with the inner spherical section and having an L-shaped flange at its enlarged end secured to the first mentioned flange and enclosing and spaced from the flange of the inner spherical housing section, and an intermediate spherical housing section having its reduced end connected to the other shaft section with its spherical portion interposed between the first two spherical sections, the spherical portion of the third section being concentric with the inner and outer spherical sections and the enlarged end of the third section being of smaller diameter than the diameters of the enlarged ends of the inner and outer sections.

In testimony whereof, I hereunto affix my signature.

CATLIN GEROLD.